US007966216B1

(12) United States Patent
Gevelber et al.

(10) Patent No.: US 7,966,216 B1
(45) Date of Patent: Jun. 21, 2011

(54) METHOD AND SYSTEM TO IDENTIFY AND TARGET CONSUMERS BASED ON THEIR SPENDING BEHAVIOR WITH RESPECT TO SUPPLEMENTARY INCOME

(75) Inventors: Lisa Cohen Gevelber, Palo Alto, CA (US); Todd M. Fitch, Santa Clara, CA (US); Benjamin Weiss, Portola Valley, CA (US)

(73) Assignee: Intuit Inc., Mountain View, CA (US)

( * ) Notice: Subject to any disclaimer, the term of this patent is extended or adjusted under 35 U.S.C. 154(b) by 525 days.

(21) Appl. No.: 12/059,234

(22) Filed: Mar. 31, 2008

(51) Int. Cl.
*G06Q 40/00* (2006.01)
(52) U.S. Cl. ............................................. 705/14; 705/30
(58) Field of Classification Search ............... 705/10–44
See application file for complete search history.

(56) References Cited

U.S. PATENT DOCUMENTS

| 7,130,813 | B2 * | 10/2006 | Enright | 705/10 |
| 7,403,906 | B2 * | 7/2008 | Coleman | 705/14.66 |
| 7,493,267 | B1 * | 2/2009 | Walker et al. | 705/14.14 |
| 2003/0233278 | A1 * | 12/2003 | Marshall | 705/14 |
| 2006/0212380 | A1 * | 9/2006 | Williams et al. | 705/35 |
| 2007/0100778 | A1 * | 5/2007 | Enright | 705/400 |

\* cited by examiner

*Primary Examiner* — Frantzy Poinvil
(74) *Attorney, Agent, or Firm* — Gunnison, Mckay & Hodgson, L.L.P.; Philip McKay

(57) ABSTRACT

In accordance with one embodiment, a system and method for providing consumers marketing devices based on their use of supplementary income includes obtaining consumer financial data associated with a given "consumer" from one or more sources. At least part of the consumer financial data is then analyzed to determine if the given consumer typically receives supplementary income and, if so, how the consumer typically treats any supplementary income received. A supplementary income profile is then created for the given consumer. Data representing the supplementary income profile for the given consumer is then stored and at least part of the data representing the supplementary income profile for the given consumer is provided to one or more product marketers. One or more product marketers then provide a marketing device to the given consumer. The marketing device itself, and/or the time when the marketing device is provided to the given consumer, and/or the terms of the marketing device, is/are based, at least in part, on the data representing the supplementary income profile for the given consumer provided to one or more product marketers and analysis of the data representing the supplementary income profile for the given consumer performed by the product marketers.

38 Claims, 2 Drawing Sheets

METHOD AND SYSTEM TO IDENTIFY AND TARGET CONSUMERS BASED ON THEIR SPENDING BEHAVIOR WITH RESPECT TO SUPPLEMENTARY INCOME

BACKGROUND

Many consumers, and businesses, create, and try to adhere to, financial budgets. To this end, many consumers, and businesses, employ one or more computing system implemented financial management systems such as, but not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications.

Regardless of the means used to create a budget, most consumers create a budget based on "standard" income sources such as, but not limited to: salary; commissions; hourly pay; and any other regularly and periodically received/expected income. However, in addition to their standard income, many consumers receive "supplementary" income such as, but not limited to: performance-based bonuses; holiday based bonuses; performance-based commissions; tax refunds; tax rebates; stock dividends; profit sharing; structured settlement payments; or any other form of income that is received in addition to standard income.

Despite the fact that many types of supplementary income are periodic in nature, and are often very predictable, both in terms of amount and timing, many consumers treat supplementary income as money that is outside the budgeting process. Consequently, many consumers treat supplementary income quite differently than their standard income. As an example, some consumers treat supplementary income as "disposable" income that is available to spend on products and/or services of a luxury or relatively frivolous nature such as new electronics, vacations, hobbies, etc. On the other hand, some consumers treat supplementary income as investment capital to be invested and saved. Whichever type of consumer a given consumer is, in many cases, the way a given consumer treats supplementary income is often very identifiable and very predictable once a pattern is established. For instance, a given consumer may regularly, and very predictably, use his or her Christmas bonus to fund a trip to Las Vegas each year.

Sellers and/or providers of consumer goods and services, and advertisers and providers of marketing devices, herein also referred collectively as "product marketers" are constantly looking for new ways to provide advertising and/or marketing devices to potential customers more effectively and efficiently. This includes new ways to more specifically target a given "type" of consumer having a given consumer spending profile. Consequently, many product marketers would benefit from: identifying if, and when, a given consumer typically receives supplementary income; how a given consumer treats his or her supplemental income, i.e., does a given consumer typically spend or save supplementary income; and, if the given consumer typically spends supplemental income, how he or she spends it, or if the given consumer typically saves supplementary income how he or she chooses to invest it. If product marketers had this information, then a product marketer could target a given consumer with one or more marketing devices such as, but not limited to: coupons, advertisements, discount certificates, price guarantees, and vouchers.

In addition, most consumers would prefer to receive advertising that is relevant to the consumer, i.e., that is of use to the consumer and/or is directed to products and/or services the consumer uses when he or she uses them.

Despite the desire of product marketers, as well as consumers, to create a better system for reaching desirable consumers, there currently is often no information, or limited information, available to the product marketers about a given consumer to enable the product marketers to accurately profile a given consumer with respect supplementary income.

As a result of the situation discussed above, product marketers are denied the opportunity to identify and target particularly desirable consumers based on their supplementary income usage, and consumers are also denied savings and efficiency that might otherwise be available to them. Consequently, the current situation represents a disservice to product marketers, as well as consumers.

SUMMARY

In accordance with one embodiment, a system and method for providing consumers marketing devices based on their use of supplementary income includes a process for providing consumers marketing devices based on their use of supplementary income whereby consumer financial data associated with a given "consumer" is obtained from one or more sources. In one embodiment, at least part of the consumer financial data is then analyzed to determine if the given consumer typically receives supplementary income and, if so, how the given consumer typically treats any supplementary income received. In one embodiment, a supplementary income profile is then created for the given consumer. In one embodiment, data representing the supplementary income profile for the given consumer is stored by the process for providing consumers marketing devices. In one embodiment, at least part of the data representing the supplementary income profile for the given consumer is provided to one or more product marketers. In one embodiment, one or more of the one or more product marketers provide a marketing device to the given consumer. In one embodiment, the marketing device, and/or the time when the marketing device is provided to the given consumer, and/or the terms of the marketing device, is/are based, at least in part on the data representing the supplementary income profile for the given consumer provided to one or more product marketers.

In one embodiment, the consumer financial data obtained from a given consumer includes data indicating all income received by the given consumer from all sources, over a defined period, including all standard income and all supplementary income and their sources. In one embodiment, the consumer financial data obtained from a given consumer includes historical data indicating all income received by the given consumer from all sources, including all standard income and all supplementary income, their sources, and when the income is typically/historically received.

In one embodiment, the consumer financial data obtained from a given consumer includes general financial data representing a given consumer's general and/or overall financial status and/or demographics, including, but not limited to: the consumer's income; the occupation/profession of the consumer; the consumer's marital status and/or number of dependents; the consumer's area of residence/zip code; the consumer's total assets; details regarding one or more of the consumer's assets, such as the size and location of the consumer's house; the consumer's total liabilities/debt; the consumer's net worth; the consumer's average discretionary spending; details regarding the consumer's spending habits and monthly/recurring expenses; details regarding the consumer's spending habits with respect to specific products/services purchased; the consumer's age group; various demographic data regarding the consumer and/or the consumer's spending; and/or any other data regarding the consumer's general and/or overall financial status desired and/or available.

In one embodiment, the consumer financial data for a given consumer includes data regarding specific consumer financial transactions conducted by the consumer including, but not limited to: dates of specific financial transactions; payees/payers associated with specific financial transactions; categories of specific financial transactions; total expenditures in specific financial transaction categories over designated time frames; specific items purchased through specific financial transactions; and/or any other data regarding specific financial transactions desired and/or available.

In one embodiment, the consumer financial data for a given consumer is obtained from one or more computing system implemented financial management systems as defined herein, and/or as known in the art the time of filing, and/or as developed after the time of filing.

In one embodiment, the given consumer agrees to share the consumer financial data with the process for providing consumers marketing devices based on their use of supplementary income, and/or product marketers, on a transaction-by-transaction approval basis. In one embodiment, the consumer agrees to share the consumer financial data with the process for providing consumers marketing devices based on their use of supplementary income, and/or product marketers, on a transaction category approval basis. In one embodiment, the consumer agrees to share the consumer financial data with the process for providing consumers marketing devices based on their use of supplementary income, and/or product marketers, without restriction. In other embodiments, the consumer agrees to share the consumer financial data with the process for providing consumers marketing devices based on their use of supplementary income, and/or product marketers, based on any restrictions/criteria defined by the consumer.

In one embodiment, the consumer financial data to be shared is tagged as sharable by the consumers using a user interface device such as a keyboard, mouse, touchpad, voice recognition system, or any other device capable of providing user input to a computing system and/or for translating user actions into computing system operations, whether available or known at the time of filing or as developed later.

In one embodiment, specific consumer financial transaction data is categorized by the consumer and one or more specific consumer financial transactions are associated by the consumer with one or more supplemental income sources. In one embodiment, specific consumer financial transaction data is categorized by the consumer and one or more specific consumer financial transactions are associated by the consumer with a specific category, such as vacations, utilities, or clothing, or car/gas. In one embodiment, specific consumer financial transaction data is categorized by a computing system implemented financial management system, as defined herein, known at the time of filing, or as developed thereafter. In one embodiment, specific consumer financial transaction data is categorized by the process for providing consumers marketing devices based on their use of supplementary income and/or the provider of the process for providing consumers marketing devices based on their use of supplementary income.

In one embodiment, at least part of the consumer financial data is then analyzed by the process for providing consumers marketing devices based on their use of supplementary income to create a supplementary income profile for the given consumer that includes, but is not limited to, data representing one or more of the following pieces of information associated with the given consumer: whether or not the given consumer typically receives supplementary income; if a given consumer receives supplementary income, how much supplementary income is typically received in a given period of time; if a given consumer receives supplementary income, is the supplementary income received at established times of year and/or on any other periodic basis; if a given consumer receives supplementary income, does the given consumer typically spend or save/invest the supplementary income; if a given consumer receives supplementary income, and the given consumer typically spends the supplemental income, how he or she spends it; and/or if a given consumer receives supplementary income, and the given consumer typically saves the supplementary income, how he or she chooses to invest it.

In one embodiment, data representing the supplementary income profile for the given consumer is stored by the process for providing consumers marketing devices, in one embodiment, based on the given consumers use of supplementary income, typically in accounts/locations associated with the given consumer and/or based on identified consumer attributes associated with the given consumer.

In one embodiment, at least part of the data representing the supplementary income profile for the given consumer is provided to one or more product marketers by providing the one or more product marketers access to the data on a database, as defined herein, known in the art at the time of filing, or as developed after the time of filing. In one embodiment, at least part of the data representing the supplementary income profile for the given consumer is provided to one or more product marketers by transferring the data to a computing system, as defined herein, known in the art at the time of filing, or as developed after the time of filing, via a network, as defined herein, known in the art at the time of filing, or as developed after the time of filing. In one embodiment, at least part of the data representing the supplementary income profile for the given consumer is provided to one or more product marketers by any method, apparatus, process or mechanism for transferring data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, whether known at the time of filing or as thereafter developed.

In one embodiment, one or more of the one or more product marketers provide a marketing device to the given consumer. In one embodiment, the marketing device, the time when the marketing device is provided to the given consumer, and/or the terms of the marketing device, is/are based, at least in part on the data representing the supplementary income profile for the given consumer provided to one or more product marketers.

In one embodiment, the marketing devices include, but are not limited to, advertisements, coupons, discount certificates, discount vouchers, sales offers, and/or any other marketing tool and/or device and/or offer that is presented, and/or offered to, and/or obtained by, a consumer.

In one embodiment, the marketing devices provided to the given consumer by the one or more product marketers include electronic media based marketing devices such as, but limited to: a screen pop-up/pop-up window coupon, advertisement, and/or other marketing device; a search engine result based coupon, advertisement, and/or other marketing device; a Microsoft Windows Microsoft Windows Vista sidebar gadget coupon, advertisement, and/or other marketing device, and/or any other sidebar display coupon, advertisement, and/or other marketing device; an Internet browser plug-in coupon, advertisement, and/or other marketing device; a pop-up link coupon, advertisement, and/or other marketing device; a screen header, footer, sidebar, or frame displayed coupon, advertisement, and/or other marketing device; an electronic attachment coupon, advertisement, and/or other marketing device; a video and/or audio coupon, advertisement, and/or other marketing device; and/or any other advertisement and/or electronic media based marketing device, as discussed herein, as known in the art at the time of filing, or as developed/made available after the time of filing.

In one embodiment, the one or more product marketers distribute the one or more marketing devices to the given consumer via: networks of computing systems, including public networks such as the Internet and/or cellular networks; web-sites; e-mail; cable television, satellite television, and/or "on demand" television services; data embedded in digital media such as DVDs, CDs, and MP3 files; data displayed in on-line digital media stores, such a iTunes; electronic attachments to electronic receipts; electronic attachments to transactional data, such as, but not limited to, transactional data from and/or displayed by, banks, credit card companies, and other financial institutions; and/or by any other method and/or mechanism for distributing an electronic media based marketing device as discussed herein, as known in the art at the time of filing, or as developed/made available after the time of filing.

Using the system and method for providing consumers marketing devices based on their use of supplementary income disclosed herein, a product marketer is provided enough information about a given consumer to enable the product marketers to accurately target a given consumer based on their spending habits with respect to supplementary income. As a result, using the system and method for providing consumers marketing devices based on their use of supplementary income disclosed herein, product marketers are given the opportunity to identify and target particularly desirable consumers based on their supplementary income usage, and consumers are also potentially provided savings and efficiency that, absent the system and method for providing consumers marketing devices based on their use of supplementary income disclosed herein, might not be available to them.

Figure 1:
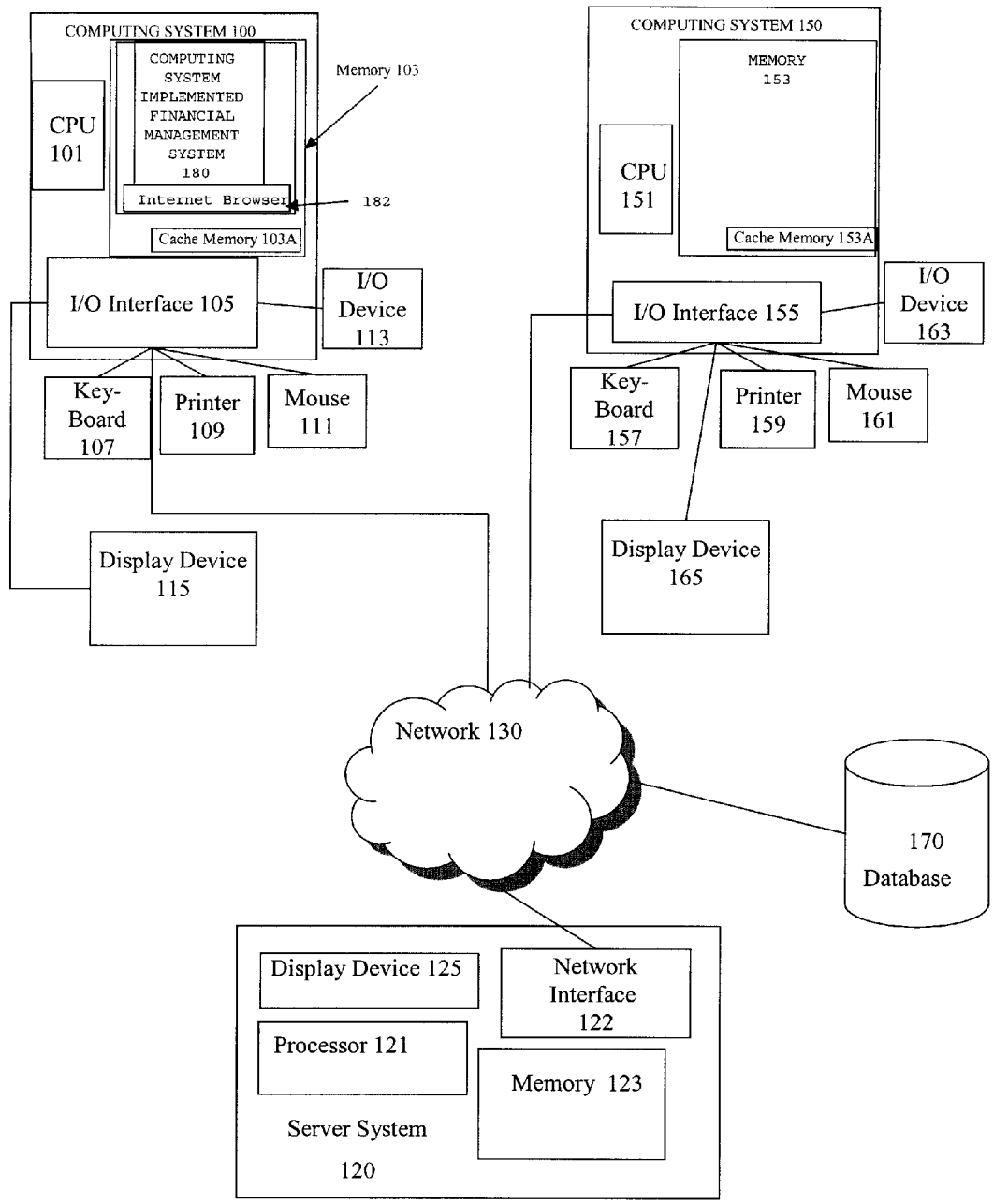
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for providing consumers marketing devices based on their use of supplementary income includes a process for providing consumers marketing devices based on their use of supplementary income whereby consumer financial data associated with a given "consumer" is obtained from one or more sources. In one embodiment, at least part of the consumer financial data is then analyzed to determine if the given consumer typically receives supplementary income and, if so, how the consumer typically treats any supplementary income received. In one embodiment, a supplementary income profile is then created for the consumer. In one embodiment, data representing the supplementary income profile for the given consumer is stored by the process for providing consumers marketing devices. In one embodiment, at least part of the data representing the supplementary income profile for the given consumer is provided to one or more product marketers. In one embodiment, one or more of the one or more product marketers provide a marketing device to the given consumer. In one embodiment, the marketing device, and/or the time when the marketing device is provided to the given consumer, and/or the terms of the marketing device, is/are based, at least in part on the data representing the supplementary income profile for the given consumer provided to one or more product marketers.

Hardware System Architecture

FIG. 1 is a block diagram of an exemplary hardware architecture for implementing one embodiment of a system and method for providing consumers marketing devices based on their use of supplementary income, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a computing system implemented financial management system 180 such as any computing system implemented financial management system defined herein, known in the art at the time of filing, and/or as developed thereafter. In one embodiment, computing system implemented financial management system 180 is stored, in whole, or in part, in memory system 103, and is used by, or includes, or is accessed by, a process for providing consumers marketing devices based on their use of supplementary income, such as exemplary process 200 (FIG. 2) discussed below.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing consumers marketing devices based on their use of supplementary income and/or a computing system implemented financial management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, computing system 100 is a computing system accessible by a given consumer and/or users and used, and/or accessible, by another computing system, such as computing system 150 (discussed below). Computing systems 100 and 150 can be any computing system as defined herein and/or as known in the art at the time of filing and/or as developed thereafter, that includes components that can execute all, or part, of a process for providing consumers marketing devices based on their use of supplementary income, and/or a computing system implemented financial management system, in accordance with at least one of the embodiments as described herein.

In one embodiment, computing system 100 is used, controlled, and/or accessible by, a provider of and/or a system and process for providing consumers marketing devices based on their use of supplementary income and data representing all, or part, of financial data associated with a given consumer, and/or data representing a supplemental income profile for a given consumer, is stored in computing system 100, typically in accounts/locations associated with a given consumer. In one embodiment, computing system 100 is used, controlled, and/or accessible by, a provider of and/or a computing system implemented financial management system and data representing all, or part, of financial data associated with a given consumer, and/or data representing a supplemental income profile for a given consumer, is stored in computing system 100, typically in accounts/locations associated with a given consumer.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 is used, controlled, and/or accessible by one or more users and used, and/or accessible, by another computing system, such as computing system 100. In one embodiment, computing system 150 is used, controlled, and/or accessible by, a provider of and/or a system and process for providing consumers marketing devices based on their use of supplementary income and data representing all, or part, of data associated with one or more consumers and/or data representing a supplemental income profile for a given consumer is stored in computing system 150, typically in accounts/locations associated with a given consumer. In one embodiment, computing system 150 is used, controlled, and/or accessible by, a provider of and/or a computing system implemented financial management system and data representing all, or part, of financial data associated with one or more consumers and/or data representing a supplemental income profile for a given consumer is stored in computing system 150, typically in accounts/locations associated with a given consumer.

As discussed in more detail below, in one embodiment, all, or part of, a process for providing consumers marketing devices based on their use of supplementary income, and/or a computing system implemented financial management system, can also be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of a consumer, and/or the consumer's agents, a user, and/or the user's agents, and/or a process for providing consumers marketing devices based on their use of supplementary income, and/or a computing system implemented financial management system.

In one embodiment, database 170 is used, controlled, and/or accessible by, a provider of and/or a system and process for providing consumers marketing devices based on their use of supplementary income and data representing all, or part, of financial data associated with a given consumer, and/or data representing a supplemental income profile for a given consumer, is stored in database 170 (FIG. 1). In one embodiment, database 170 is used, controlled, and/or accessible by, a provider of and/or a computing system implemented financial management system and data representing all, or part, of financial data associated with a given consumer, and/or data representing a supplemental income profile for a given consumer, is stored in database 170.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a provider of and/or a system and process for providing consumers marketing devices based on their use of supplementary income and data representing all, or part, of financial data associated with a given consumer, and/or data representing a supplemental income profile for a given consumer, is stored in server system 120. In one embodiment, server system 120 is used, controlled, and/or accessible by, a provider of and/or a computing system implemented financial management system and data representing all, or part, of financial data associated with a given consumer, and/or data representing a supplemental income profile for a given consumer, is stored in server system 120.

Network 130 can be any network or network system as defined herein, known in the art at the time of filing, and/or as developed after the time of filing, capable of allowing communication between two or more computing systems.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for providing consumers marketing devices based on their use of supplementary income, and/or a computing system implemented financial management system, and/or financial data associated with a given consumer, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for providing consumers marketing devices based on their use of supplementary income, and/or a computing system implemented financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing consumers marketing devices based on their use of supplementary income and/or a computing system implemented financial management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for providing consumers marketing devices based on their use of supplementary income, and/or a computing system implemented financial management system, and/or financial data associated with a given consumer, and/or data representing a supplemental income profile for a given consumer, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "consumer" and "user consumer" are used interchangeable to denote any party and/or entity for whom, or from whom, consumer financial data is obtained by a process for providing consumers marketing devices based on their use of supplementary income, and/or a person and/or entity for whom, or from whom, consumer financial data is obtained by a process for providing consumers marketing devices based on their use of supplementary income, and/or a legal guardian of person and/or entity for whom, or from whom, consumer financial data is obtained by a process for providing consumers marketing devices based on their use of supplementary income, and/or an authorized agent of any party and/or person and/or entity for whom, or from whom, consumer financial data is obtained by a process for providing consumers marketing devices based on their use of supplementary income.

Herein, the term "product marketer" denotes providers of consumer goods and services, and other advertisers, and/or any party and/or entity that interfaces with, and/or to whom information is provided by, a process for providing consumers marketing devices based on their use of supplementary income, and/or a person and/or entity that interfaces with, and/or to whom information is provided by, a process for providing consumers marketing devices based on their use of supplementary income, and/or a legal guardian of person and/or entity that interfaces with, and/or to whom information is provided by, a process for providing consumers marketing devices based on their use of supplementary income, and/or an authorized agent of any party and/or person and/or entity that interfaces with, and/or to whom information is provided by, a process for providing consumers marketing devices based on their use of supplementary income.

Herein, the term "marketing device" is used to denote advertisements, coupons, discount certificates, discount vouchers, sales offers, and/or any other marketing tool and/or device and/or offer that is presented, and/or offered to, and/or obtained by, a consumer. Herein, the term "marketing device" includes electronic media based marketing devices such as any marketing device distributed primarily, and/or initially, through an electronic means such as, but not limited to: networks of computing systems, including public networks such as the Internet and/or web-sites, and/or cellular networks; e-mail; cable television, satellite television, and "on demand" television services; data embedded in digital media such as DVDs, CDs, and MP3 files; data displayed in on-line digital media stores, such a iTunes; electronic attachments to electronic receipts; electronic attachments to transactional data, such as, but not limited to, transactional data from and/or displayed by, banks, credit card companies, and other financial institutions; and/or by any other method and/or mechanism for distributing an electronic media based marketing device as discussed herein, as known in the art at the time of filing, or as developed/made available after the time of filing. Consequently, as used herein, a "marketing device" can be, but is not limited to, any one of the following: a screen pop-up/pop-up window coupon, advertisement, and/or other marketing device; a search engine result based coupon, advertisement, and/or other marketing device; a Microsoft Windows Vista sidebar gadget coupon, advertisement, and/or other marketing device, and/or any other sidebar display coupon, advertisement, and/or other marketing device; an Internet browser plug-in coupon, advertisement, and/or other marketing device; a pop-up link coupon, advertisement, and/or other marketing device; a screen header, footer, sidebar, or frame displayed coupon, advertisement, and/or other marketing device; an electronic attachment coupon, advertisement, and/or other marketing device; a video and/or audio coupon, advertisement, and/or other marketing device; and/or any other advertisement and/or electronic media based marketing device, as discussed herein, as known in the art at the time of filing, or as developed/made available after the time of filing.

As used herein, the term "standard income" includes, but is not limited to, regularly received and expected sources of income such as, but not limited to: salary; commissions; hourly pay; and any other regularly and periodically received/expected income.

As used herein, the term "supplementary income" includes, but is not limited to, sources of income other than standard income such as, but not limited to: performance-based bonuses; holiday based bonuses; performance-based commissions; tax refunds; tax rebates; stock dividends; profit sharing; structured settlement payments; or any other form of income that is received in addition to, or in place of, standard income.

As used herein, the term computing system, denotes, but is not limited to: a portable computer; a workstation; a two-way pager; a cellular telephone; a smart phone; a digital wireless telephone; a Personal Digital Assistant (PDA); a media player, i.e., an MP3 Player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term computing system implemented financial management system includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filing or as developed later.

As used herein, the term "network" is used to demote any network or network system that is of interest such as, a peer-to-peer network, a hybrid peer-to-peer network, a Local Area Network (LAN), a Wide Area Network (WAN), a public network, such as the Internet, a private network, a combination of different network types, cellular networks, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to a data storage means that is part of, or under the control of, any computing system, as defined, known at the time of filing, or as developed thereafter.

In accordance with one embodiment, a system and method for providing consumers marketing devices based on their use of supplementary income includes a process for providing consumers marketing devices based on their use of supplementary income whereby consumer financial data associated with a given "consumer" is obtained from one or more sources. In one embodiment, at least part of the consumer financial data is then analyzed to determine if the given consumer typically receives supplementary income and, if so, how the consumer typically treats any supplementary income received. In one embodiment, a supplementary income profile is then created for the consumer. In one embodiment, data representing the supplementary income profile for the given consumer is stored by the process for providing consumers marketing devices. In one embodiment, at least part of the data representing the supplementary income profile for the given consumer is provided to one or more product marketers. In one embodiment, one or more of the one or more product marketers provide a marketing device to the given consumer. In one embodiment, the marketing device, and/or the time when the marketing device is provided to the given consumer, and/or the terms of the marketing device, is/are based, at least in part on the data representing the supplementary income profile for the given consumer provided to one or more product marketers.

Figure 2:
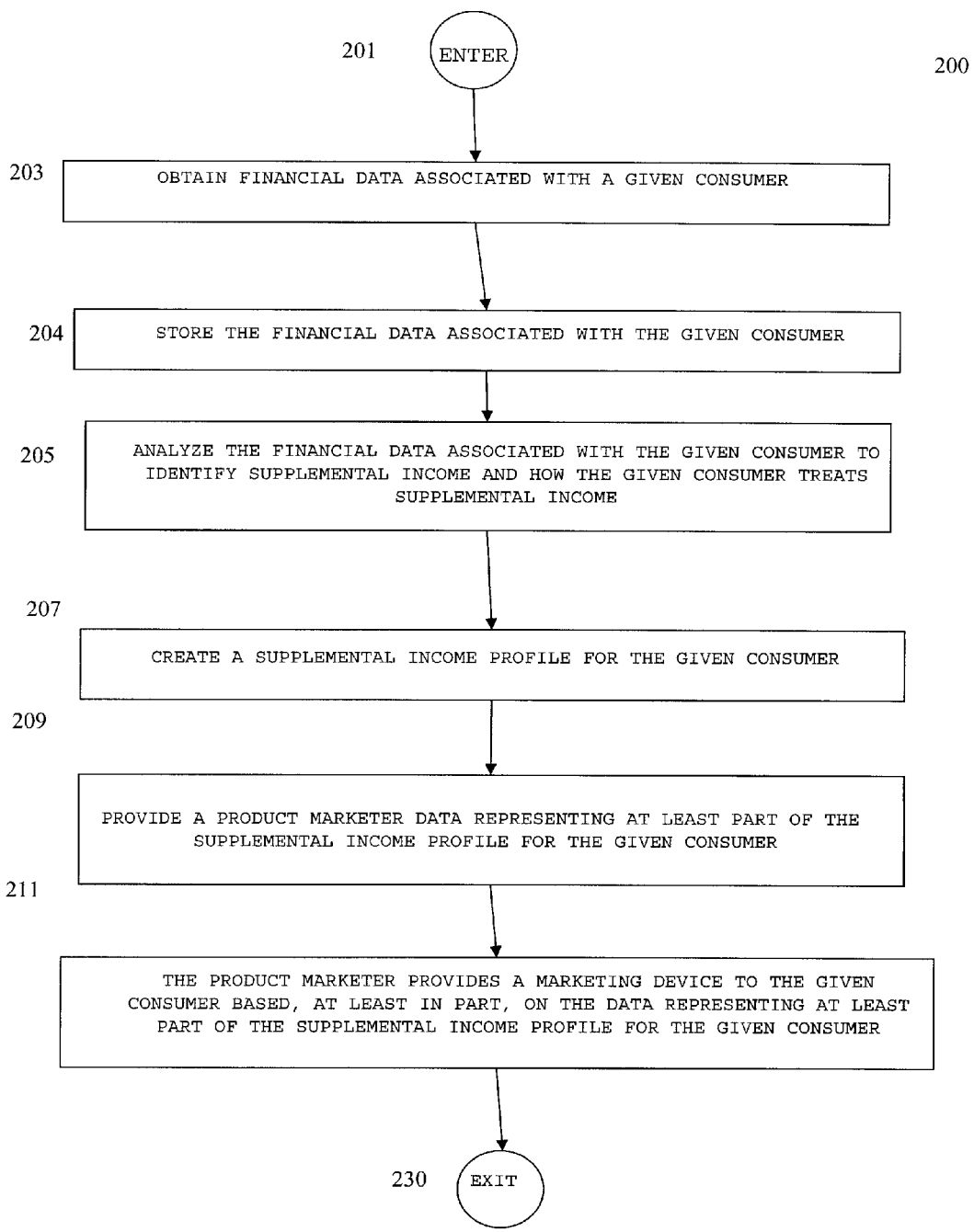
FIG. 2 is a flow chart depicting a process for providing consumers marketing devices based on their use of supplementary income in accordance with one embodiment.

FIG. 2 is a flow chart depicting a process for providing consumers marketing devices based on their use of supplementary income 200 in accordance with one embodiment. Process for providing consumers marketing devices based on their use of supplementary income 200 begins at ENTER OPERATION 201 of FIG. 2 and process flow proceeds to OBTAIN FINANCIAL DATA ASSOCIATED WITH A GIVEN CONSUMER OPERATION 203.

In one embodiment, at OBTAIN FINANCIAL DATA ASSOCIATED WITH A GIVEN CONSUMER OPERATION 203 consumer financial data associated with a given "consumer" is obtained from one or more sources.

In one embodiment, at OBTAIN FINANCIAL DATA ASSOCIATED WITH A GIVEN CONSUMER OPERATION 203 the given consumer agrees to share the consumer financial data with process for providing consumers marketing devices based on their use of supplementary income 200 and/or one or more "product marketers" by any one of various means, including, tagging specific financial data as sharable data. In one embodiment, the consumer financial data includes data associated with specific consumer financial transactions and, in one embodiment, the specific consumer financial transactions are tagged as sharable by the given consumer. In one embodiment, the specific consumer financial transactions are categorized by the consumers and/or associated with a specific type of income such as standard and/or supplemental income.

In one embodiment, the consumer financial data obtained from a given consumer at OBTAIN FINANCIAL DATA ASSOCIATED WITH A GIVEN CONSUMER OPERATION 203 includes data indicating all income received by the given consumer from all sources, over a defined period, including all standard income and all supplementary income and their sources. In one embodiment, the consumer financial data obtained from a given consumer at OBTAIN FINANCIAL DATA ASSOCIATED WITH A GIVEN CONSUMER OPERATION 203 includes historical data indicating all income received by the given consumer from all sources, including all standard income and all supplementary income, their sources, and when the income is typically/historically received.

In one embodiment, at OBTAIN FINANCIAL DATA ASSOCIATED WITH A GIVEN CONSUMER OPERATION 203, the consumer financial data obtained from a given consumer includes general financial data obtained from the given consumer representing a given consumer's general and/or overall financial status and/or demographics, including, but not limited to: the given consumer's occupation/profession; the status of the given consumer as a business owner/operator or an employee; the given consumer's marital status and/or number of dependents; the given consumer's area of residence/zip code; the given consumer's total assets; details regarding one or more of the given consumer's assets, such as the size and location of the given consumer's house and/or the type of car the given consumer drives; the given consumer's total income and/or the percentage of the given consumer's income spent in a given category of financial data; the given consumer's net worth; the given consumer's average discretionary spending and/or the percentage of the given consumer's discretionary spending spent in a given category of consumer financial data; the given consumer's age group; various demographic data regarding the given consumer and/or the given consumer's spending; the given consumer's commute; the given consumer's yearly mileage; and/or any other data regarding the given consumer's general and/or overall financial status desired and/or available.

In one embodiment, as discussed below, the consumer's general and/or overall financial status and/or demographics data is used to identify one or more given consumer attributes associated with a given consumer, and to categorize their consumer financial data, according to the identified one or more consumer attributes.

In one embodiment, at OBTAIN FINANCIAL DATA ASSOCIATED WITH A GIVEN CONSUMER OPERATION 203 the consumer financial data associated with a given consumer represents one or more consumer financial transactions conducted by a given consumer. In one embodiment, at OBTAIN FINANCIAL DATA ASSOCIATED WITH A GIVEN CONSUMER OPERATION 203 the consumer financial data representing various consumer financial transactions conducted by the given consumer includes, but is not limited to, data representing: dates of specific consumer financial transactions; payees/payers associated with specific consumer financial transactions; categories of specific consumer financial transactions, such as the expense category assigned to a given specific consumer financial transaction; total expenditures in specific consumer financial transaction categories over designated time frames; specific items purchased through specific consumer financial transactions; the geographic location of specific consumer financial transactions; the geographic location where one or more services and/or products associated with specific consumer financial transactions are used/delivered; and/or any other data regarding specific consumer financial transactions desired and/or available.

In one embodiment, at OBTAIN FINANCIAL DATA ASSOCIATED WITH A GIVEN CONSUMER OPERATION 203 at least part of the consumer financial data associated with a given consumer is obtained by process for providing consumers marketing devices based on their use of supplementary income 200 using, and/or through, and/or from, a computing system implemented financial management system, as defined herein, known in the art at the time of filing, or as developed after the time of filing.

In one embodiment, the consumer financial data associated with a given consumer obtained at OBTAIN FINANCIAL DATA ASSOCIATED WITH A GIVEN CONSUMER OPERATION 203 includes data associated with consumer financial transactions conducted using multiple payment methods and/or accounts to provide as complete a set of consumer financial data as possible. For instance, in one embodiment, the consumer financial data associated with a given consumer is obtained at OBTAIN FINANCIAL DATA ASSOCIATED WITH A GIVEN CONSUMER OPERATION 203 from, but not limited to, any one or more of the following sources: banks; debit cards and/or accounts; credit unions; credit cards and/or accounts and/or credit card/account providers; asset accounts and/or asset account providers; a user controlled computing system implemented financial management system; or other financial resources, accounts and/or services used by a given consumer to pay for and/or conduct consumer financial transactions.

In addition, in some embodiments, the consumer financial data associated with a given consumer obtained at OBTAIN FINANCIAL DATA ASSOCIATED WITH A GIVEN CONSUMER OPERATION 203 is obtained from multiple sources of the same type. For instance, in one embodiment, the consumer financial data associated with a given consumer is obtained at OBTAIN FINANCIAL DATA ASSOCIATED WITH A GIVEN CONSUMER OPERATION 203 from: two or more banks; two or more debit cards and/or accounts; two or more credit unions; two or more credit cards and/or accounts and/or credit card/account providers; two or more asset accounts and/or asset account providers; two or more user controlled computing system implemented financial management systems; and/or two or more other financial resources, accounts and/or services used by a given consumer to pay for and/or conduct consumer financial transactions.

As noted above, in one embodiment, all, or part, of the consumer financial data associated with a given consumer is obtained by process for providing consumers marketing devices based on their use of supplementary income 200 at OBTAIN FINANCIAL DATA ASSOCIATED WITH A GIVEN CONSUMER OPERATION 203 from, or using, a computing system implemented financial management system, such as computing system implemented financial management system 180 (FIG. 1), that implements, includes, is accessed by, and/or is otherwise associated with process for providing consumers marketing devices based on their use of supplementary income 200 (FIG. 2).

Currently, various computing system implemented financial management systems are available as defined herein. Computing system implemented financial management systems typically help users/consumers manage their finances by providing a centralized interface with banks, credit card companies, and other various financial institutions and/or accounts, for identifying, processing, storing, and categorizing consumer financial transactions and other consumer financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification or various other systems for transferring financial transaction data.

In addition, many currently available computing system implemented financial management systems help users/consumers manage their finances by categorizing and recording all sources of user income, such as standard and supplementary income, recording the amount of income, recording the source of the income, recording the date on which the income is received, and then using this income information to track income events/flow and to provide various historical data reports.

As noted above, using computing system implemented financial management systems, the financial transaction information, user defined category of the financial transaction, payee identification, payee location, payment amount, date of the transaction, and other data is often used by the computing system implemented financial management system to categorize individual financial transactions as a particular type of income or expense. Some currently offered computing system implemented financial management systems then use this financial transaction information to track events, such as purchase events, and to provide various historical data reports or displays including "to date" data reports such as historical spending data reports in one or more particular sources of income, categories, associated with one or more particular products and/or services, and/or with one or more particular payees, and/or one or more specific events.

In one embodiment, the consumer financial data associated with a given consumer obtained using one or more computing system implemented financial management systems is transferred, or otherwise made available to, process for providing consumers marketing devices based on their use of supplementary income 200 at OBTAIN FINANCIAL DATA ASSOCIATED WITH A GIVEN CONSUMER OPERATION 203.

In one embodiment, all, or part, of the consumer financial data associated with a given consumer is obtained by process for providing consumers marketing devices based on their use of supplementary income 200 at OBTAIN FINANCIAL DATA ASSOCIATED WITH A GIVEN CONSUMER OPERATION 203 from invoices/bills and/or receipt data provided to process for providing consumers marketing devices based on their use of supplementary income 200, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the transaction.

As noted above, in one embodiment, process for providing consumers marketing devices based on their use of supplementary income 200 is associated with a computing system implemented financial management system, such as computing system implemented financial management system 180 of FIG. 1, that implements, includes, is accessed by, and/or is otherwise associated with process for providing consumers marketing devices based on their use of supplementary income 200 (FIG. 2). Some of these computing system implemented financial management systems provide the capability to obtain, receive, and/or process electronic copies of the invoices/receipts from one or more merchants and/or product and/or service providers, often in their specific formats, and then process and/or store the data for use by process for providing consumers marketing devices based on their use of supplementary income 200 in one of numerous locations by one of numerous methods known to those of skill in the art and/or as discussed herein.

In one embodiment, all, or part, of the consumer financial data associated with a given consumer is obtained by process for providing consumers marketing devices based on their use of supplementary income 200, and/or a computing system implemented financial management system, at OBTAIN FINANCIAL DATA ASSOCIATED WITH A GIVEN CONSUMER OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct consumer financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct consumer financial transactions.

In one embodiment, all, or part, of the consumer financial data associated with a given consumer is obtained by process for providing consumers marketing devices based on their use of supplementary income 200 at OBTAIN FINANCIAL DATA ASSOCIATED WITH A GIVEN CONSUMER OPERATION 203 from consumer input through a user interface device such as keyboard 107, 157, mouse 111, 161 of FIG. 1 or a touchpad, voice recognition system, or any other device capable of providing user input to a computing system and/or for translating user actions into computing system operations, whether available or known at the time of filing or as developed later.

Returning to FIG. 2, in one embodiment, all, or part, of the consumer financial data associated with a given consumer is obtained by process for providing consumers marketing devices based on their use of supplementary income 200 at OBTAIN FINANCIAL DATA ASSOCIATED WITH A GIVEN CONSUMER OPERATION 203 from any combination of the above sources and/or from any other source of consumer financial data associated with a given consumer whether known at the time of filing or as developed thereafter.

As noted above, in one embodiment, at OBTAIN FINANCIAL DATA ASSOCIATED WITH A GIVEN CONSUMER OPERATION 203 the consumers agree to share all or part of their consumer financial data with process for providing consumers marketing devices based on their use of supplementary income 200 and/or one or more "product marketers" by any one of various means, including, tagging specific financial data as sharable data.

In one embodiment, at OBTAIN FINANCIAL DATA ASSOCIATED WITH A GIVEN CONSUMER OPERATION 203 the consumers agree to share the consumer financial data with process for providing consumers marketing devices based on their use of supplementary income 200 and/or one or more "product marketers" on a transaction-by-transaction approval basis. In one embodiment, at OBTAIN FINANCIAL DATA ASSOCIATED WITH A GIVEN CONSUMER OPERATION 203, the consumers agree to share the consumer financial data with process for providing consumers marketing devices based on their use of supplementary income 200 and/or one or more product marketers on a financial data category approval basis. In one embodiment, at OBTAIN FINANCIAL DATA ASSOCIATED WITH A GIVEN CONSUMER OPERATION 203 the consumers agree to share the consumer financial data with process for providing consumers marketing devices based on their use of supplementary income 200 and/or one or more product marketers without restriction. In other embodiments, at OBTAIN FINANCIAL DATA ASSOCIATED WITH A GIVEN CONSUMER OPERATION 203 the consumers agree to share the consumer financial data with process for providing consumers marketing devices based on their use of supplementary income 200 and/or one or more product marketers based on any restrictions/criteria dictated by the consumer.

In one embodiment, at OBTAIN FINANCIAL DATA ASSOCIATED WITH A GIVEN CONSUMER OPERATION 203, the consumer financial data to be shared is tagged as sharable by the consumers using a user interface display and a user interface device, such as those defined herein, known in the art, or developed after the time of filing.

In one embodiment, specific consumer financial transaction data is assigned a category/name and/or a description by the consumer and one or more specific consumer financial transactions are associated by the consumer with a specific type of income, such as standard income and/or supplementary income, and/or expense.

In one embodiment, specific consumer financial transaction data is categorized by a computing system implemented financial management system, as defined herein, known at the time of filing, or as developed thereafter. In one embodiment, specific consumer financial transaction data is categorized by process for providing consumers marketing devices based on their use of supplementary income 200 and/or the provider of process for providing consumers marketing devices based on their use of supplementary income 200.

In one embodiment, at OBTAIN FINANCIAL DATA ASSOCIATED WITH A GIVEN CONSUMER OPERATION 203 one or more consumer attributes associated with a given consumer are identified, in one embodiment, using a given consumer's general and/or overall financial status and/or demographics data. In one embodiment, the one or more consumer attributes associated with a given consumer identified at OBTAIN FINANCIAL DATA ASSOCIATED WITH A GIVEN CONSUMER OPERATION 203 include, but are not limited to: the given consumer's occupation/profession; whether the given consumer is a business owner/operator or an employee; the given consumer's marital status and/or number of dependents; the given consumer's area of residence/zip code; the consumer's total assets; details regarding one or more of the given consumer's assets, such as the size and location of the consumer's house; the given consumer's total liabilities/debt; the given consumer's net worth; the consumer's average discretionary spending; details regarding the given consumer's spending habits and monthly/recurring expenses; the given consumer's age group; various demographic data regarding the given consumer and/or the given consumer's spending; the given consumer's commute; and/or any other data regarding the given consumer's general and/or overall financial status desired and/or available.

As noted, in one embodiment, the one or more consumer attributes associated with a given consumer are identified using a given consumer's general and/or overall financial status and/or demographics data obtained at OBTAIN FINANCIAL DATA ASSOCIATED WITH A GIVEN CONSUMER OPERATION 203. In one embodiment, the one or more consumer attributes associated with a given consumer are identified/provided by the given consumer themselves, in one embodiment, using a user interface device such as those discussed herein, known in the art at the time of filing, or as developed thereafter.

Methods, means, processes, procedures and mechanisms for analyzing, aggregating, and categorizing data according to various parameters/criteria are well known in the art. Consequently, a more detailed discussion of any specific methods, means, processes, procedures and mechanisms for analyzing, aggregating, and categorizing data, such as, in one embodiment, is performed at OBTAIN FINANCIAL DATA ASSOCIATED WITH A GIVEN CONSUMER OPERATION 203, is omitted here to avoid detracting from the invention.

In one embodiment, once financial data associated with the given consumer is obtained from one or more sources and/or one or more consumer attributes associated with a given consumer are identified at OBTAIN FINANCIAL DATA ASSOCIATED WITH A GIVEN CONSUMER OPERATION 203, process flow proceeds to STORE THE FINANCIAL DATA ASSOCIATED WITH THE GIVEN CONSUMER OPERATION 204.

In one embodiment, at STORE THE FINANCIAL DATA ASSOCIATED WITH THE GIVEN CONSUMER OPERATION 204, at least part of the consumer financial data of OBTAIN FINANCIAL DATA ASSOCIATED WITH A GIVEN CONSUMER OPERATION 203 is stored by, or under the control of, process for providing consumers marketing devices based on their use of supplementary income 200, typically in accounts/locations associated with the given consumer and/or based on the identified consumer attributes associated with the given consumer of OBTAIN FINANCIAL DATA ASSOCIATED WITH A GIVEN CONSUMER OPERATION 203.

In one embodiment, at STORE THE FINANCIAL DATA ASSOCIATED WITH THE GIVEN CONSUMER OPERATION 204, the consumer financial data is stored in whole, or in part, in a database maintained by, accessible by, owned by, or otherwise related to: process for providing consumers marketing devices based on their use of supplementary income 200, and/or a provider of process for providing consumers marketing devices based on their use of supplementary income 200; a computing system implemented financial management system, and/or a provider of a computing system implemented financial management system; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the consumer financial data stored as described above is maintained, in whole, or in part, by: process for providing consumers marketing devices based on their use of supplementary income 200, and/or a provider of process for providing consumers marketing devices based on their use of supplementary income 200; a computing system implemented financial management system, and/or a provider of a computing system implemented financial management system; one or more product marketers; a third party data storage institution; any third party service or institution; or any other parties. In one embodiment, access to the consumer financial data is provided to process for providing consumers marketing devices based on their use of supplementary income 200, and/or a computing system implemented financial management system, by providing access to the data and/or providing the data on a computer program product.

In one embodiment, once at least part of the consumer financial data of OBTAIN FINANCIAL DATA ASSOCIATED WITH A GIVEN CONSUMER OPERATION 203 is stored by, or under the control of, process for providing consumers marketing devices based on their use of supplementary income 200, at STORE THE FINANCIAL DATA ASSOCIATED WITH THE GIVEN CONSUMER OPERATION 204, process flow proceeds to ANALYZE THE FINANCIAL DATA ASSOCIATED WITH THE GIVEN CONSUMER TO IDENTIFY SUPPLEMENTAL INCOME AND HOW THE GIVEN CONSUMER TREATS SUPPLEMENTAL INCOME OPERATION 205.

In one embodiment, at ANALYZE THE FINANCIAL DATA ASSOCIATED WITH THE GIVEN CONSUMER TO IDENTIFY SUPPLEMENTAL INCOME AND HOW THE GIVEN CONSUMER TREATS SUPPLEMENTAL INCOME OPERATION 205 at least part of the consumer financial data is then analyzed to determine if the given consumer typically receives supplementary income and, if so, how the given consumer typically treats any supplementary income received.

As noted above, in one embodiment, at OBTAIN FINANCIAL DATA ASSOCIATED WITH A GIVEN CONSUMER OPERATION 203 the financial data associated with the given consumer obtained includes data indicating all income received by the given consumer from all sources, over a defined period, including all standard income and all supplementary income and their sources as well as historical data indicating all income received by the given consumer from all sources, including all standard income and all supplementary income, their sources, and when the income is typically/historically received. In addition, in one embodiment at OBTAIN FINANCIAL DATA ASSOCIATED WITH A GIVEN CONSUMER OPERATION 203 the financial data associated with the given consumer obtained includes both general financial data associated with the given consumer and specific transaction data associated with the given consumer indicating how the given consumer treats their various sources of income.

In one embodiment, at ANALYZE THE FINANCIAL DATA ASSOCIATED WITH THE GIVEN CONSUMER TO IDENTIFY SUPPLEMENTAL INCOME AND HOW THE GIVEN CONSUMER TREATS SUPPLEMENTAL INCOME OPERATION 205 at least part of this financial data associated with the given consumer obtained at OBTAIN FINANCIAL DATA ASSOCIATED WITH A GIVEN CONSUMER OPERATION 203 is analyzed to determine, any of, but not limited to, the following: whether or not the given consumer typically receives supplementary income; if a given consumer receives supplementary income, how much supplementary income is typically received in a given period of time; if a given consumer receives supplementary income, what are the sources of the supplementary income; if a given consumer receives supplementary income, is the supplementary income received at established times of year and/or on any other periodic basis; if a given consumer receives supplementary income, does the given consumer typically spend or save/invest the supplementary income; if a given consumer receives supplementary income, and the given consumer typically spends the supplemental income, how he or she spends it; and/or if a given consumer receives supplementary income, and the given consumer typically saves the supplementary income, how he or she chooses to invest it.

In one embodiment, once at least part of the consumer financial data is analyzed to determine if the given consumer typically receives supplementary income and, if so, how the given consumer typically treats any supplementary income received at ANALYZE THE FINANCIAL DATA ASSOCIATED WITH THE GIVEN CONSUMER TO IDENTIFY SUPPLEMENTAL INCOME AND HOW THE GIVEN CONSUMER TREATS SUPPLEMENTAL INCOME OPERATION 205, process flow proceeds to CREATE A SUPPLEMENTAL INCOME PROFILE FOR THE GIVEN CONSUMER OPERATION 207.

In one embodiment, at CREATE A SUPPLEMENTAL INCOME PROFILE FOR THE GIVEN CONSUMER OPERATION 207 the analysis of ANALYZE THE FINANCIAL DATA ASSOCIATED WITH THE GIVEN CONSUMER TO IDENTIFY SUPPLEMENTAL INCOME AND HOW THE GIVEN CONSUMER TREATS SUPPLEMENTAL INCOME OPERATION 205 is used to create a supplementary income profile for the given consumer.

In one embodiment, at CREATE A SUPPLEMENTAL INCOME PROFILE FOR THE GIVEN CONSUMER OPERATION 207 the analysis of ANALYZE THE FINANCIAL DATA ASSOCIATED WITH THE GIVEN CONSUMER TO IDENTIFY SUPPLEMENTAL INCOME AND HOW THE GIVEN CONSUMER TREATS SUPPLEMENTAL INCOME OPERATION 205 is used to create a supplementary income profile for the given consumer that includes, but is not limited to, data representing one or more of the following pieces of information associated with the given consumer: whether or not the given consumer typically receives supplementary income; if a given consumer receives supplementary income, how much supplementary income is typically received in a given period of time; if a given consumer receives supplementary income, is the supplementary income received at established times of year and/or on any other periodic basis; if a given consumer receives supplementary income, does the given consumer typically spend or save/invest the supplementary income; if a given consumer receives supplementary income, and the given consumer typically spends the supplemental income, how he or she spends it; and/or if a given consumer receives supplementary income, and the given consumer typically saves the supplementary income, how he or she chooses to invest it.

In one embodiment, at CREATE A SUPPLEMENTAL INCOME PROFILE FOR THE GIVEN CONSUMER OPERATION 207, data representing the supplementary income profile for the given consumer is then stored by process for providing consumers marketing devices 200. In one embodiment, at CREATE A SUPPLEMENTAL INCOME PROFILE FOR THE GIVEN CONSUMER OPERATION 207, data representing the supplementary income profile for the given consumer is stored by process for providing consumers marketing devices 200 in accounts/locations associated with the given consumer and/or based on identified consumer attributes associated with the given consumer.

In one embodiment, at CREATE A SUPPLEMENTAL INCOME PROFILE FOR THE GIVEN CONSUMER OPERATION 207, data representing the supplementary income profile for the given consumer is stored by process for providing consumers marketing devices 200 in a computing system memory associated with a computing system and/or server system, such as memory 103 of computing system 100, and/or memory 153 of computing system 150, and/or memory 123 of server system 120 of FIG. 1, and/or a database such as database 170 of FIG. 1, and/or by any means, mechanism, or process discussed herein, known in the art/available at the time of filing, or as developed after the time of filing.

Returning to FIG. 2, in one embodiment, once the analysis of ANALYZE THE FINANCIAL DATA ASSOCIATED WITH THE GIVEN CONSUMER TO IDENTIFY SUPPLEMENTAL INCOME AND HOW THE GIVEN CONSUMER TREATS SUPPLEMENTAL INCOME OPERATION 205 is used to create a supplementary income profile for the given consumer and/or data representing the supplementary income profile for the given consumer is stored at CREATE A SUPPLEMENTAL INCOME PROFILE FOR THE GIVEN CONSUMER OPERATION 207, process flow proceeds to PROVIDE A PRODUCT MARKETER DATA REPRESENTING AT LEAST PART OF THE SUPPLEMENTAL INCOME PROFILE FOR THE GIVEN CONSUMER OPERATION 209.

In one embodiment, at PROVIDE A PRODUCT MARKETER DATA REPRESENTING AT LEAST PART OF THE SUPPLEMENTAL INCOME PROFILE FOR THE GIVEN CONSUMER OPERATION 209 at least part of the data representing the supplementary income profile for the given consumer of CREATE A SUPPLEMENTAL INCOME PROFILE FOR THE GIVEN CONSUMER OPERATION 207 is provided to one or more "product marketers".

In one embodiment, at PROVIDE A PRODUCT MARKETER DATA REPRESENTING AT LEAST PART OF THE SUPPLEMENTAL INCOME PROFILE FOR THE GIVEN CONSUMER OPERATION 209 at least part of the data representing the supplementary income profile for the given consumer of CREATE A SUPPLEMENTAL INCOME PROFILE FOR THE GIVEN CONSUMER OPERATION 207 is provided to one or more product marketers by providing the one or more product marketers access to the data on a database, such as database 170 of FIG. 1, and/or as defined herein, known in the art at the time of filing, or as developed after the time of filing.

Returning to FIG. 2, in one embodiment, at PROVIDE A PRODUCT MARKETER DATA REPRESENTING AT LEAST PART OF THE SUPPLEMENTAL INCOME PROFILE FOR THE GIVEN CONSUMER OPERATION 209 at least part of the data representing the supplementary income profile for the given consumer of CREATE A SUPPLEMENTAL INCOME PROFILE FOR THE GIVEN CONSUMER OPERATION 207 is provided to one or more product marketers by providing the one or more product marketers access to the data on a computing system memory associated with a computing system and/or server system, such as memory 103 of computing system 100, and/or memory 153 of computing system 150, and/or memory 123 of server system 120 of FIG. 1, and/or a database such as database 170 of FIG. 1, and/or by any means, mechanism, or process discussed herein, known in the art/available at the time of filing, or as developed after the time of filing.

Returning to FIG. 2, in one embodiment, at PROVIDE A PRODUCT MARKETER DATA REPRESENTING AT LEAST PART OF THE SUPPLEMENTAL INCOME PROFILE FOR THE GIVEN CONSUMER OPERATION 209 at least part of the data representing the supplementary income profile for the given consumer of CREATE A SUPPLEMENTAL INCOME PROFILE FOR THE GIVEN CONSUMER OPERATION 207 is provided to one or more product marketers by providing the one or more product marketers access to the data on a webpage, in a web-based system or on a public network such as the Internet.

In one embodiment, at PROVIDE A PRODUCT MARKETER DATA REPRESENTING AT LEAST PART OF THE SUPPLEMENTAL INCOME PROFILE FOR THE GIVEN CONSUMER OPERATION 209 at least part of the data representing the supplementary income profile for the given consumer of CREATE A SUPPLEMENTAL INCOME PROFILE FOR THE GIVEN CONSUMER OPERATION 207 is provided to one or more product marketers by providing the one or more product marketers access to the data on a computer readable medium, and/or any other computer program product, as defined herein.

In one embodiment, at PROVIDE A PRODUCT MARKETER DATA REPRESENTING AT LEAST PART OF THE SUPPLEMENTAL INCOME PROFILE FOR THE GIVEN CONSUMER OPERATION 209 at least part of the data representing the supplementary income profile for the given consumer of CREATE A SUPPLEMENTAL INCOME PROFILE FOR THE GIVEN CONSUMER OPERATION 207 is provided to one or more product marketers by transferring the data to a computing system, as defined herein, known in the art at the time of filing, or as developed after the time of filing, via a network, as defined herein, known in the art at the time of filing, or as developed after the time of filing.

In one embodiment, at PROVIDE A PRODUCT MARKETER DATA REPRESENTING AT LEAST PART OF THE SUPPLEMENTAL INCOME PROFILE FOR THE GIVEN CONSUMER OPERATION 209 at least part of the data representing the supplementary income profile for the given consumer of CREATE A SUPPLEMENTAL INCOME PROFILE FOR THE GIVEN CONSUMER OPERATION 207 is provided to one or more product marketers by any method, apparatus, process or mechanism for transferring data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, whether known at the time of filing or as thereafter developed.

In one embodiment, once at least part of the data representing the supplementary income profile for the given consumer of CREATE A SUPPLEMENTAL INCOME PROFILE FOR THE GIVEN CONSUMER OPERATION 207 is provided to one or more "product marketers" at PROVIDE A PRODUCT MARKETER DATA REPRESENTING AT LEAST PART OF THE SUPPLEMENTAL INCOME PROFILE FOR THE GIVEN CONSUMER OPERATION 209, process flow process to THE PRODUCT MARKETER PROVIDES A MARKETING DEVICE TO THE GIVEN CONSUMER BASED, AT LEAST IN PART, ON THE DATA REPRESENTING AT LEAST PART OF THE SUPPLEMENTAL INCOME PROFILE FOR THE GIVEN CONSUMER OPERATION 211.

In one embodiment, at THE PRODUCT MARKETER PROVIDES A MARKETING DEVICE TO THE GIVEN CONSUMER BASED, AT LEAST IN PART, ON THE DATA REPRESENTING AT LEAST PART OF THE SUPPLEMENTAL INCOME PROFILE FOR THE GIVEN CONSUMER OPERATION 211 one or more of the one or more product marketers of A PRODUCT MARKETER DATA REPRESENTING AT LEAST PART OF THE SUPPLEMENTAL INCOME PROFILE FOR THE GIVEN CONSUMER OPERATION 209 provide a "marketing device" to the given consumer. In one embodiment, the marketing device, and/or the time when the marketing device is provided to the given consumer, and/or the terms of the marketing device, is/are based, at least in part, on the data representing the supplementary income profile for the given consumer provided to one or more product marketers and analysis of data representing the supplementary income profile for the given consumer by the one or more product marketers.

In one embodiment, one or more of the marketing devices provided to the given consumer at THE PRODUCT MARKETER PROVIDES A MARKETING DEVICE TO THE GIVEN CONSUMER BASED, AT LEAST IN PART, ON THE DATA REPRESENTING AT LEAST PART OF THE SUPPLEMENTAL INCOME PROFILE FOR THE GIVEN CONSUMER OPERATION 211 include, but are not limited to, advertisements, coupons, discount certificates, discount vouchers, sales offers, and/or any other marketing tool and/or device and/or offer that is presented, and/or offered to, and/or obtained by, a consumer.

In one embodiment, one or more of the marketing devices provided to the given consumer at THE PRODUCT MARKETER PROVIDES A MARKETING DEVICE TO THE GIVEN CONSUMER BASED, AT LEAST IN PART, ON THE DATA REPRESENTING AT LEAST PART OF THE SUPPLEMENTAL INCOME PROFILE FOR THE GIVEN CONSUMER OPERATION 211 include electronic media based marketing devices such as, but limited to: a screen pop-up/pop-up window coupon, advertisement, and/or other marketing device; a search engine result based coupon, advertisement, and/or other marketing device; a Microsoft Windows Vista sidebar gadget coupon, advertisement, and/or other marketing device, and/or any other sidebar display coupon, advertisement, and/or other marketing device; an Internet browser plug-in coupon, advertisement, and/or other marketing device; a pop-up link coupon, advertisement, and/or other marketing device; a screen header, footer, sidebar, or frame displayed coupon, advertisement, and/or other marketing device; an electronic attachment coupon, advertisement, and/or other marketing device; a video and/or audio coupon, advertisement, and/or other marketing device; and/or any other advertisement and/or electronic media based marketing device, as discussed herein, as known in the art at the time of filing, or as developed/made available after the time of filing.

In one embodiment, the one or more product marketers distribute the one or more marketing devices to the given consumer at THE PRODUCT MARKETER PROVIDES A MARKETING DEVICE TO THE GIVEN CONSUMER BASED, AT LEAST IN PART, ON THE DATA REPRESENTING AT LEAST PART OF THE SUPPLEMENTAL INCOME PROFILE FOR THE GIVEN CONSUMER OPERATION 211 via: networks of computing systems, including public networks such as the Internet; web-sites; e-mail; cable television, satellite television, and/or "on demand" television services; data embedded in digital media such as DVDs, CDs, and MP3 files; data displayed in on-line digital media stores, such a iTunes; electronic attachments to electronic receipts; electronic attachments to transactional data, such as, but not limited to, transactional data from and/or displayed by, banks, credit card companies, and other financial institutions; and/or by any other method and/or mechanism for distributing a marketing device as discussed herein, as known in the art at the time of filing, or as developed/made available after the time of filing.

As noted above, in one embodiment, at THE PRODUCT MARKETER PROVIDES A MARKETING DEVICE TO THE GIVEN CONSUMER BASED, AT LEAST IN PART, ON THE DATA REPRESENTING AT LEAST PART OF THE SUPPLEMENTAL INCOME PROFILE FOR THE GIVEN CONSUMER OPERATION 211 the marketing device, and/or the time when the marketing device is provided to the given consumer, and/or the terms of the marketing device, is/are based, at least in part, on the data representing the supplementary income profile for the given consumer provided to one or more product marketers and analysis of data representing the supplementary income profile for the given consumer by the one or more product marketers.

As a specific, and purely illustrative, example, it is stipulated that at ANALYZE THE FINANCIAL DATA ASSOCIATED WITH THE GIVEN CONSUMER TO IDENTIFY SUPPLEMENTAL INCOME AND HOW THE GIVEN CONSUMER TREATS SUPPLEMENTAL INCOME OPERATION 205 it is determined that, based on the financial data obtained at OBTAIN FINANCIAL DATA ASSOCIATED WITH A GIVEN CONSUMER OPERATION 203, a given consumer receives his tax refund check each May and that the given consumer typically uses this supplementary income to take a trip to Las Vegas.

In this specific example, at CREATE A SUPPLEMENTAL INCOME PROFILE FOR THE GIVEN CONSUMER OPERATION 207, process for providing consumers marketing devices based on their use of supplementary income 200 creates a supplemental income profile for the given consumer indicating that he does receive regular supplementary income, that he does spend the supplementary income, and that he spends it in Las Vegas. In one example of one embodiment, at least part of this data is made available to a product marketer at PROVIDE A PRODUCT MARKETER DATA REPRESENTING AT LEAST PART OF THE SUPPLEMENTAL INCOME PROFILE FOR THE GIVEN CONSUMER OPERATION 209 that, in this specific example, is a Casino in Las Vegas. Then, in this specific example, at THE PRODUCT MARKETER PROVIDES A MARKETING DEVICE TO THE GIVEN CONSUMER BASED, AT LEAST IN PART, ON THE DATA REPRESENTING AT LEAST PART OF THE SUPPLEMENTAL INCOME PROFILE FOR THE GIVEN CONSUMER OPERATION 211, the Casino in Las Vegas sends the given consumer a marketing device in the form of a electronic coupon attachment to a financial transaction in a computing system implemented personal financial management system for a significant discount on hotel rooms that is valid from May to July.

As another specific, and purely illustrative, example, it is stipulated that at ANALYZE THE FINANCIAL DATA ASSOCIATED WITH THE GIVEN CONSUMER TO IDENTIFY SUPPLEMENTAL INCOME AND HOW THE GIVEN CONSUMER TREATS SUPPLEMENTAL INCOME OPERATION 205 it is determined that, based on the financial data obtained at OBTAIN FINANCIAL DATA ASSOCIATED WITH A GIVEN CONSUMER OPERATION 203, a given consumer receives his tax refund check each May and that the given consumer typically uses this supplementary income to invest in long term bonds.

In this specific example, at CREATE A SUPPLEMENTAL INCOME PROFILE FOR THE GIVEN CONSUMER OPERATION 207, process for providing consumers marketing devices based on their use of supplementary income 200 creates a supplemental income profile for the given consumer indicating that he does receive regular supplementary income, that he invests the supplementary income, and that he invests the supplementary income in bonds. In one example of one embodiment, at least part of this data is made available to a product marketer at PROVIDE A PRODUCT MARKETER DATA REPRESENTING AT LEAST PART OF THE SUPPLEMENTAL INCOME PROFILE FOR THE GIVEN CONSUMER OPERATION 209 who, in this specific example, is an investment banker. Then, in this specific example, at THE PRODUCT MARKETER PROVIDES A MARKETING DEVICE TO THE GIVEN CONSUMER BASED, AT LEAST IN PART, ON THE DATA REPRESENTING AT LEAST PART OF THE SUPPLEMENTAL INCOME PROFILE FOR THE GIVEN CONSUMER OPERATION 211, the investment banker sends the given consumer a marketing device in the form of a advertisement identifying the investment banker and the advertisement is sent to the given consumer in the May to June time frame.

In one embodiment, once one or more of the one or more product marketers of A PRODUCT MARKETER DATA REPRESENTING AT LEAST PART OF THE SUPPLEMENTAL INCOME PROFILE FOR THE GIVEN CONSUMER OPERATION 209 provide a "marketing device" to the given consumer at THE PRODUCT MARKETER PROVIDES A MARKETING DEVICE TO THE GIVEN CONSUMER BASED, AT LEAST IN PART, ON THE DATA REPRESENTING AT LEAST PART OF THE SUPPLEMENTAL INCOME PROFILE FOR THE GIVEN CONSUMER OPERATION 211, process flow proceeds to EXIT OPERATION 230. In one embodiment, at EXIT OPERATION 230, process for providing consumers marketing devices based on their use of supplementary income 200 is exited to await new data.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Using process for providing consumers marketing devices based on their use of supplementary income 200, a product marketer is provided enough information about a given consumer to enable the product marketers to accurately target a given consumer based on their spending habits with respect to supplementary income. As a result, using process for providing consumers marketing devices based on their use of supplementary income 200, product marketers are given the opportunity to identify and target particularly desirable consumers based on their supplementary income usage, and consumers are also potentially provided savings and efficiency that, absent process for providing consumers marketing devices based on their use of supplementary income 200, might not be made available to them.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "analyzing", "obtaining", "identifying", "associating", "activating"; "initiating"; "collecting", "creating", "transferring", "storing", "searching", "notifying", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for providing consumers marketing devices based on their use of supplementary income comprising:
   obtaining electronic consumer financial data from a bank, the consumer financial data comprising historical financial transactions of a given consumer;
   receiving, from the given consumer for each given transaction within the historical transaction data, a category to be assigned the given transaction, and assigning the received category to the given transaction, wherein categories available for assignment comprise vacation, utilities, clothing, and either automobile or gas;
   receiving from the given consumer one or more categories of transactions approved to be sharable;
   analyzing transactions within the sharable categories of the consumer financial data to identify supplemental income associated with the given consumer and to determine how the given consumer historically utilizes the identified supplementary income;
   creating a supplementary income profile for the given consumer based on the analysis of the consumer financial data;
   providing data representing at least part of the supplementary income profile for the given consumer to a product marketer; and
   the product marketer providing the given consumer a marketing device based, at least in part, on analysis by the product marketer of the data representing at least part of the supplementary income profile for the given consumer, wherein the marketing device is provided to the given consumer using an electronic distribution media selected from the group of electronic distribution media consisting of:
   a network of one or more computing systems;
   a public network of one or more computing systems;
   the Internet;
   one or more web-sites;
   e-mail;
   cable television;
   satellite television;
   "on demand" television services;
   data embedded in digital media such as DVDs, CDs, and MP3 files;
   data displayed in on-line digital media stores;
   electronic attachments to electronic receipts; and
   electronic attachments to transactional data displayed by, banks, credit card companies, and other financial institutions.

2. The computing system implemented process for providing consumers marketing devices based on their use of supplementary income of claim 1, wherein;
   obtaining consumer financial data, the consumer financial data being associated with a given consumer comprises:
   obtaining consumer financial data from the given consumer that is designated by the given consumer as sharable consumer financial data.

3. The computing system implemented process for providing consumers marketing devices based on their use of supplementary income of claim 1, wherein;
   obtaining consumer financial data, the consumer financial data being associated with a given consumer comprises:
   obtaining at least part of the consumer financial data from a computing system implemented financial management system associated with the given consumer.

4. The computing system implemented process for providing consumers marketing devices based on their use of supplementary income of claim 1, wherein;
   the consumer financial data comprises data indicating income received by the given consumer over a defined period, including standard income and supplementary income.

5. The computing system implemented process for providing consumers marketing devices based on their use of supplementary income of claim 1, wherein;
   the consumer financial data comprises historical data indicating income received by the given consumer including standard income and supplementary income, and when the income is typically received.

6. The computing system implemented process for providing consumers marketing devices based on their use of supplementary income of claim 1, wherein;
   at least part of the consumer financial data obtained includes consumer financial data indicating one or more of the consumer attributes selected from the group of consumer attributes consisting of:
   the consumer's occupation/profession;
   whether the consumer is a business owner/operator or an employee;
   the consumer's marital status and/or number of dependents;
   the consumer's area of residence/zip code;
   the consumer's total assets;

the consumer's total liabilities/debt;

the consumer's net worth;

the consumer's average discretionary spending;

the consumer's spending habits and monthly/recurring expenses; and the consumer's age group.

7. The computing system implemented process for providing consumers marketing devices based on their use of supplementary income of claim 1, wherein;

the supplementary income profile for the given consumer created based on the analysis of the consumer financial data includes data representing one or more supplementary income profile information associated with the given consumer selected form the list of supplementary income profile information associated with the given consumer consisting of:

whether or not the given consumer typically receives supplementary income;

if a given consumer receives supplementary income, what are the sources of the supplementary income;

if a given consumer receives supplementary income, how much supplementary income is typically received in a given period of time;

if a given consumer receives supplementary income, is the supplementary income received at established times of year and/or on any other periodic basis;

if a given consumer receives supplementary income, does the given consumer typically spend or save/invest the supplementary income;

if a given consumer receives supplementary income, and the given consumer typically spends the supplemental income, how he or she spends it; and if a given consumer receives supplementary income, and the given consumer typically saves the supplementary income, how he or she chooses to invest it.

8. The computing system implemented process for providing consumers marketing devices based on their use of supplementary income of claim 1, wherein;

providing data representing at least part of the supplementary income profile for the given consumer to a product marketer comprises transferring data representing at least part of the supplementary income profile for the given consumer to a computing system associated with the product marketer.

9. The computing system implemented process for providing consumers marketing devices based on their use of supplementary income of claim 1, wherein;

providing data representing at least part of the supplementary income profile for the given consumer to a product marketer comprises transferring data representing at least part of the supplementary income profile for the given consumer to a database and then providing the product marketer access to the data on the database.

10. The computing system implemented process for providing consumers marketing devices based on their use of supplementary income of claim 1, wherein;

providing data representing at least part of the supplementary income profile for the given consumer to a product marketer comprises transferring data representing at least part of the supplementary income profile for the given consumer to a computer program product and then providing the product marketer access to the data on the computer program product.

11. The computing system implemented process for providing consumers marketing devices based on their use of supplementary income of claim 1, wherein;

the product marketer is a provider of one or more products and/or services.

12. The computing system implemented process for providing consumers marketing devices based on their use of supplementary income of claim 1, wherein;

the marketing device is an electronic media based marketing device selected from the group of electronic media based marketing devices consisting of:

a screen pop-up/pop-up window marketing device;

a search engine result based marketing device;

a Microsoft Windows Vista sidebar gadget marketing device;

a sidebar display marketing device;

an Internet browser plug-in marketing device;

a pop-up link marketing device;

a screen header, footer, sidebar, or frame marketing device;

an electronic attachment marketing device;

a video based marketing device; and an audio based marketing device.

13. A computer program product for providing a process for providing consumers marketing devices based on their use of supplementary income comprising:

a nontransitory computer readable medium;

and computer program code, encoded on the computer readable medium, comprising computer readable instructions which when executed by a processor perform a process comprising:

obtaining electronic consumer financial data from a bank, the consumer financial data comprising historical financial transactions of a given consumer;

receiving, from the given consumer for each given transaction within the historical transaction data, a category to be assigned the given transaction, and assigning the received category to the given transaction, wherein categories available for assignment comprise vacation, utilities, clothing, and either automobile or gas;

receiving from the given consumer one or more categories of transactions approved to be sharable;

analyzing transactions within the sharable categories of the consumer financial data to identify supplemental income associated with the given consumer and to determine how the given consumer historically utilizes the identified supplementary income;

creating a supplementary income profile for the given consumer based on the analysis of the consumer financial data;

providing data representing at least part of the supplementary income profile for the given consumer to a product marketer; and the product marketer providing the given consumer a marketing device based, at least in part, on analysis by the product marketer of the data representing at least part of the supplementary income profile for the given consumer.

14. The computer program product for providing a process for providing consumers marketing devices based on their use of supplementary income of claim 13, wherein;

obtaining consumer financial data, the consumer financial data being associated with a given consumer comprises:

obtaining consumer financial data from the given consumer that is designated by the given consumer as sharable consumer financial data.

15. The computer program product for providing a process for providing consumers marketing devices based on their use of supplementary income of claim 13, wherein;

obtaining consumer financial data, the consumer financial data being associated with a given consumer comprises:

obtaining at least part of the consumer financial data from a computing system implemented financial management system associated with the given consumer.

16. The computer program product for providing a process for providing consumers marketing devices based on their use of supplementary income of claim 13, wherein;

the consumer financial data comprises data indicating income received by the given consumer over a defined period, including standard income and supplementary income.

17. The computer program product for providing a process for providing consumers marketing devices based on their use of supplementary income of claim 13, wherein;

the consumer financial data comprises historical data indicating income received by the given consumer including standard income and supplementary income, and when the income is typically received.

18. The computer program product for providing a process for providing consumers marketing devices based on their use of supplementary income of claim 13, wherein;

at least part of the consumer financial data obtained includes consumer financial data indicating one or more of the consumer attributes selected from the group of consumer attributes consisting of:
the consumer's occupation/profession;
whether the consumer is a business owner/operator or an employee;
the consumer's marital status and/or number of dependents;
the consumer's area of residence/zip code;
the consumer's total assets;
the consumer's total liabilities/debt;
the consumer's net worth;
the consumer's average discretionary spending;
the consumer's spending habits and monthly/recurring expenses; and
the consumer's age group.

19. The computer program product for providing a process for providing consumers marketing devices based on their use of supplementary income of claim 13, wherein;

the supplementary income profile for the given consumer created based on the analysis of the consumer financial data includes data representing one or more supplementary income profile information associated with the given consumer selected from the list of supplementary income profile information associated with the given consumer consisting of:
whether or not the given consumer typically receives supplementary income;
if a given consumer receives supplementary income, how much supplementary income is typically received in a given period of time;
if a given consumer receives supplementary income, what are the sources of the supplementary income;
if a given consumer receives supplementary income, whether the supplementary income received at established times of year and/or on any other periodic basis and what those times or other periodic basis comprise;
if a given consumer receives supplementary income, does the given consumer typically spend or save/invest the supplementary income;
if a given consumer receives supplementary income, and the given consumer typically spends the supplemental income, how he or she spends it; and
if a given consumer receives supplementary income, and the given consumer typically saves the supplementary income, how he or she chooses to invest it.

20. The computer program product for providing a process for providing consumers marketing devices based on their use of supplementary income of claim 13, wherein;

providing data representing at least part of the supplementary income profile for the given consumer to a product marketer comprises transferring data representing at least part of the supplementary income profile for the given consumer to a computing system associated with the product marketer.

21. The computer program product for providing a process for providing consumers marketing devices based on their use of supplementary income of claim 13, wherein;

providing data representing at least part of the supplementary income profile for the given consumer to a product marketer comprises transferring data representing at least part of the supplementary income profile for the given consumer to a database and then providing the product marketer access to the data on the database.

22. The computer program product for providing a process for providing consumers marketing devices based on their use of supplementary income of claim 13, wherein;

providing data representing at least part of the supplementary income profile for the given consumer to a product marketer comprises transferring data representing at least part of the supplementary income profile for the given consumer to a computer program product and then providing the product marketer access to the data on the computer program product.

23. The computer program product for providing a process for providing consumers marketing devices based on their use of supplementary income of claim 13, wherein;

the product marketer is a provider of one or more products and/or services.

24. The computer program product for providing a process for providing consumers marketing devices based on their use of supplementary income of claim 13, wherein;

the marketing device is an electronic media based marketing device selected from the group of electronic media based marketing devices consisting of:
a screen pop-up/pop-up window marketing device;
a search engine result based marketing device;
a Microsoft Windows Vista sidebar gadget marketing device;
a sidebar display marketing device;
an Internet browser plug-in marketing device;
a pop-up link marketing device;
a screen header, footer, sidebar, or frame marketing device;
an electronic attachment marketing device;
a video based marketing device; and
an audio based marketing device.

25. The computer program product for providing a process for providing consumers marketing devices based on their use of supplementary income of claim 13, wherein;

the marketing device is provided to the given consumer using an electronic distribution media selected from the group of electronic distribution media consisting of:
a network of one or more computing systems;
a public network of one or more computing systems;
the Internet;
one or more web-sites;
e-mail;

cable television;
satellite television;
"on demand" television services;
data embedded in digital media such as DVDs, CDs, and MP3 files;
data displayed in on-line digital media stores;
electronic attachments to electronic receipts; and
electronic attachments to transactional data displayed by, banks, credit card companies, and other financial institutions.

26. A system for providing consumers marketing devices based on their use of supplementary income comprising:
    means for obtaining electronic consumer financial data from a bank, the consumer financial data comprising historical financial transactions of a given consumer;
    means for receiving, from the given consumer for each given transaction within the historical transaction data, a category to be assigned the given transaction, and assigning the received category to the given transaction, wherein categories available for assignment comprise vacation, utilities, clothing, and either automobile or gas;
    means for receiving from the given consumer one or more categories of transactions approved to be sharable;
    means for analyzing transactions within the sharable categories of the consumer financial data to identify supplemental income associated with the given consumer and to determine how the given consumer historically utilizes the identified supplementary income;
    means for creating a supplementary income profile for the given consumer based on the analysis of the consumer financial data;
    means for providing data representing at least part of the supplementary income profile for the given consumer to a product marketer; and
    means for the product marketer to provide the given consumer a marketing device based, at least in part, on analysis by the product marketer of the data representing at least part of the supplementary income profile for the given consumer.

27. The system for providing consumers marketing devices based on their use of supplementary income of claim 26, wherein;
    the means for obtaining consumer financial data, the consumer financial data being associated with a given consumer comprises:
    means for obtaining consumer financial data from the given consumer that is designated by the given consumer as sharable consumer financial data.

28. The system for providing consumers marketing devices based on their use of supplementary income of claim 26, wherein;
    the means for obtaining consumer financial data, the consumer financial data being associated with a given consumer comprises:
    means for obtaining at least part of the consumer financial data from a computing system implemented financial management system associated with the given consumer.

29. The system for providing consumers marketing devices based on their use of supplementary income of claim 26, wherein;
    the consumer financial data comprises data indicating income received by the given consumer over a defined period, including standard income and supplementary income.

30. The system for providing consumers marketing devices based on their use of supplementary income of claim 26, wherein;
    the consumer financial data comprises historical data indicating income received by the given consumer including standard income and supplementary income, and when the income is typically received.

31. The system for providing consumers marketing devices based on their use of supplementary income of claim 26, wherein;
    at least part of the consumer financial data obtained includes consumer financial data indicating one or more of the consumer attributes selected from the group of consumer attributes consisting of:
    the consumer's occupation/profession;
    whether the consumer is a business owner/operator or an employee;
    the consumer's marital status and/or number of dependents;
    the consumer's area of residence/zip code;
    the consumer's total assets;
    the consumer's total liabilities/debt;
    the consumer's net worth;
    the consumer's average discretionary spending;
    the consumer's spending habits and monthly/recurring expenses; and
    the consumer's age group.

32. The system for providing consumers marketing devices based on their use of supplementary income of claim 26, wherein;
    the supplementary income profile for the given consumer created based on the analysis of the consumer financial data includes data representing one or more supplementary income profile information associated with the given consumer selected from the list of supplementary income profile information associated with the given consumer consisting of:
    whether or not the given consumer typically receives supplementary income;
    if a given consumer receives supplementary income, how much supplementary income is typically received in a given period of time;
    if a given consumer receives supplementary income, what are the sources of the supplementary income;
    if a given consumer receives supplementary income, is the supplementary income received at established times of year and/or on any other periodic basis;
    if a given consumer receives supplementary income, does the given consumer typically spend or save/invest the supplementary income;
    if a given consumer receives supplementary income, and the given consumer typically spends the supplemental income, how he or she spends it; and
    if a given consumer receives supplementary income, and the given consumer typically saves the supplementary income, how he or she chooses to invest it.

33. The system for providing consumers marketing devices based on their use of supplementary income of claim 26, wherein;
    the means for providing data representing at least part of the supplementary income profile for the given consumer to a product marketer comprises means for transferring data representing at least part of the supplementary income profile for the given consumer to a computing system associated with the product marketer.

34. The system for providing consumers marketing devices based on their use of supplementary income of claim 26, wherein;
the means for providing data representing at least part of the supplementary income profile for the given consumer to a product marketer comprises means for transferring data representing at least part of the supplementary income profile for the given consumer to a database and then providing the product marketer access to the data on the database.

35. The system for providing consumers marketing devices based on their use of supplementary income of claim 26, wherein;
the means for providing data representing at least part of the supplementary income profile for the given consumer to a product marketer comprises means for transferring data representing at least part of the supplementary income profile for the given consumer to a computer program product and then providing the product marketer access to the data on the computer program product.

36. The system for providing consumers marketing devices based on their use of supplementary income of claim 26, wherein;
the product marketer is a provider of one or more products and/or services.

37. The system for providing consumers marketing devices based on their use of supplementary income of claim 26, wherein;
the marketing device is an electronic media based marketing device selected from the group of electronic media based marketing devices consisting of:
a screen pop-up/pop-up window marketing device;
a search engine result based marketing device;
a Microsoft Windows Vista sidebar gadget marketing device;
a sidebar display marketing device;
an Internet browser plug-in marketing device;
a pop-up link marketing device;
a screen header, footer, sidebar, or frame marketing device;
an electronic attachment marketing device;
a video based marketing device; and
an audio based marketing device.

38. The system for providing consumers marketing devices based on their use of supplementary income of claim 26, wherein;
the means for the product marketer to provide the given consumer a marketing device comprises an electronic distribution media selected from the group of electronic distribution media consisting of:
a network of one or more computing systems;
a public network of one or more computing systems;
the Internet;
one or more web-sites;
e-mail;
cable television;
satellite television;
"on demand" television services;
data embedded in digital media such as DVDs, CDs, and MP3 files;
data displayed in on-line digital media stores;
electronic attachments to electronic receipts; and
electronic attachments to transactional data displayed by, banks, credit card companies, and other financial institutions.

* * * * *

UNITED STATES PATENT AND TRADEMARK OFFICE
CERTIFICATE OF CORRECTION

| | | |
|---|---|---|
| PATENT NO. | : 7,966,216 B1 | Page 1 of 1 |
| APPLICATION NO. | : 12/059234 | |
| DATED | : June 21, 2011 | |
| INVENTOR(S) | : Lisa Cohen Gevelber, Todd M. Fitch and Benjamin Weiss | |

It is certified that error appears in the above-identified patent and that said Letters Patent is hereby corrected as shown below:

Column 28, Line 21, Claim 1, after "displayed by" delete ",";
Column 29, Line 14, Claim 7, replace "form" with --from--;
Column 31, Line 61, Claim 19, between "income" and "received" insert --is--;
Column 33, Line 8, Claim 25, after "displayed by" delete ","; and
Column 36, Line 31, Claim 38, after "displayed by" delete ",".

Signed and Sealed this
Second Day of October, 2012

David J. Kappos
*Director of the United States Patent and Trademark Office*